United States Patent

Isobe et al.

[11] Patent Number: 5,496,622
[45] Date of Patent: Mar. 5, 1996

[54] MAGNETIC RECORDING MEDIUM COMPRISING AN UNDERLAYER CONTAINING α IRON OXIDE POWDER AND A MAGNETIC LAYER CONTAINING FERROMAGNETIC METALLIC POWDER

[75] Inventors: Ryosuke Isobe; Takafumi Yanagita, both of Hino; Akira Saitoh; Akihiko Seki, both of Saku, all of Japan

[73] Assignees: Konica Corporation; TKD Corporation, both of Japan

[21] Appl. No.: 280,793

[22] Filed: Jul. 26, 1994

[30] Foreign Application Priority Data

Jul. 26, 1993 [JP] Japan ................................. 5-184012

[51] Int. Cl.$^6$ .................................................... G11B 5/00
[52] U.S. Cl. ........................... 428/216; 428/328; 428/329; 428/336; 428/403; 428/694 BS; 428/694 BM; 428/900
[58] Field of Search ..................... 428/216, 328, 428/329, 336, 403, 694 BS, 694 BM, 900

[56] References Cited

U.S. PATENT DOCUMENTS

| | | |
|---|---|---|
| 4,404,254 | 9/1983 | Frauz et al. .............................. 428/329 |
| 4,956,220 | 9/1990 | Sueyoshi et al. ........................ 428/141 |
| 5,110,658 | 5/1992 | Nakano et al. .......................... 428/141 |
| 5,258,223 | 11/1993 | Inaba et al. .............................. 428/323 |
| 5,268,206 | 12/1993 | Komatsu et al. ........................ 427/548 |
| 5,358,777 | 10/1994 | Kojima et al. ........................... 428/212 |

*Primary Examiner*—Stevan A. Resan
*Attorney, Agent, or Firm*—Bierman and Muserlian

[57] ABSTRACT

Disclosed is a magnetic recording medium which comprises a non-magnetic support and a layer containing α-iron oxide powder as a lower layer and a layer containing ferromagnetic powder as an upper layer which are provided on the non-magnetic support in this order from a side of the non-magnetic support, wherein weight ratios of elements in the whole composition of the α-iron oxide powder are 0.05 to 5 parts by weight of aluminum (Al) atom and 0.05 to 5 parts by weight of silicon (Si) atom based on 100 parts by weight of iron (Fe) atom, and average existence ratios of elements in terms of the number of atoms forming the surface of the α-iron oxide powder are 40 or less of Al atom and 1 to 60 of Si atom based on the number of Fe atom as 100.

18 Claims, No Drawings

MAGNETIC RECORDING MEDIUM COMPRISING AN UNDERLAYER CONTAINING α IRON OXIDE POWDER AND A MAGNETIC LAYER CONTAINING FERROMAGNETIC METALLIC POWDER

BACKGROUND OF THE INVENTION

1. Field of the Invention

This invention relates to a magnetic recording medium, more specifically to a magnetic recording medium suitable as a digital recording medium and having excellent surface characteristics and also excellent electromagnetic transfer characteristics and runnability.

2. Background of the Invention

In a conventional magnetic recording medium, quality has been heightened by making magnetic powder finer or using a multilayer structure in which an upper layer is a magnetic layer and a lower layer is a non-magnetic layer.

However, in the former case, magnetic powder is merely made finer so that sufficient characteristics cannot be obtained. As an example disclosing the latter case, there may be mentioned Japanese Provisional Patent Publication No. 187418/1988. It has been found by the present inventors' investigation that characteristics of non-magnetic powder are not specified therein so that it is impossible to improve dispersibility of magnetic powder or non-magnetic powder in a coating for forming a magnetic layer or a non-magnetic layer and also calenderability in a calender step is lowered, whereby surface characteristics of a magnetic recording medium cannot be in preferred states. Further, they have also found that by using the conventional magnetic recording medium, it is difficult to obtain a magnetic recording medium having excellent electromagnetic transfer characteristics and runnability which are necessary as a digital recording medium.

Also, they have found that when non-magnetic powder containing α-iron oxide as a main component is merely contained in a coating, dispersibility and standing stability of the coating are low so that when a magnetic recording medium is made to have a multilayer structure, it is difficult to form a sufficiently smooth upper layer coating film, whereby high electromagnetic transfer characteristics cannot be obtained and running durability is worsened.

SUMMARY OF THE INVENTION

The present inventors have studied while paying attention to surface and whole compositions of α-iron oxide powder itself or a surface composition of α-iron oxide existing in a coating film and consequently found that the above problems can be solved by using a specific composition, to accomplish the present invention.

In consideration of the above problems, an object of the present invention is to provide a magnetic recording medium suitable as a digital recording medium and having excellent surface characteristics and also excellent electromagnetic transfer characteristics and runnability, and to provide a magnetic recording medium using a coating for a lower layer having excellent dispersibility and standing stability and a lower layer coating film having excellent smoothness and running durability.

That is, the technical tasks of the present invention can be accomplished by the following constitutions.

1. A magnetic recording medium which comprises a non-magnetic support and a layer containing α-iron oxide powder as a lower layer and a layer containing ferromagnetic powder as an upper layer which are provided on the non-magnetic support in this order from a side of the non-magnetic support, wherein the surface of the α-iron oxide powder in the lower layer has the average existence ratios of elements of 0 to 40 of aluminum (Al) atom and 1 to 60 of silicon (Si) atom based on the number of iron (Fe) atom as 100 in terms of the number of atoms.

2. The magnetic recording medium of above 1, wherein the surface of the α-iron oxide powder has the average existence ratios of elements of 0 to 10 of aluminum (Al) atom, 1 to 40 of silicon (Si) atom and 1 to 70 of phosphorus (P) atom based on the number of iron (Fe) atom as 100 in terms of the number of atoms.

3. The magnetic recording medium of above 2, wherein the α-iron oxide powder has the weight ratios of elements of 0.05 to 2 parts by weight of aluminum (Al) atom, 0.05 to 2 parts by weight of silicon (Si) atom and 0.2 to 5 parts by weight of phosphorus (P) atom based on 100 parts by weight of iron (Fe) atom.

4. The magnetic recording medium of above 2, wherein the surface of the α-iron oxide powder further has the average existence ratios of elements of 0 to less than 5 of sodium (Na) atom based on the number of iron (Fe) atom as 100 in terms of the number of atoms.

5. The magnetic recording medium of above 4, wherein the α-iron oxide powder has the weight ratios of elements of 0.05 to 2 parts by weight of aluminum (Al) atom, 0.05 to 2 parts by weight of silicon (Si) atom, 0.2 to 5 parts by weight of phosphorus (P) atom and 0 to 0.05 part by weight of sodium (Na) atom based on 100 parts by weight of iron (Fe) atom.

6. The magnetic recording medium of above 1, wherein the surface of the α-iron oxide powder has the average existence ratios of elements of 1 to 40 of aluminum (Al) atom, 1 to 40 of silicon (Si) atom and 1 to 30 of alkaline earth elements atom based on the number of iron (Fe) atom as 100 in terms of the number of atoms.

7. The magnetic recording medium of above 6, wherein the α-iron oxide powder has the weight ratios of elements of 0.2 to 5 parts by weight of aluminum (Al) atom, 0.2 to 5 parts by weight of silicon (Si) atom and 0.2 to 5 parts by weight of alkaline earth elements atom based on 100 parts by weight of iron (Fe) atom.

8. The magnetic recording medium of above 6, wherein the surface of the α-iron oxide powder further has the average existence ratios of elements of 0 to less than 5 of sodium (Na) atom based on the number of iron (Fe) atom as 100 in terms of the number of atoms.

9. The magnetic recording medium of above 8, wherein the α-iron oxide powder has the weight ratios of elements of 0.2 to 5 parts by weight of aluminum (Al) atom, 0.2 to 5 parts by weight of silicon (Si) atom, 0 to less than 0.05 part by weight of sodium (Na) atom and 0.2 to 5 parts by weight of alkaline earth elements atom based on 100 parts by weight of iron (Fe) atom.

10. The magnetic recording medium of above 1, wherein the α-iron oxide powder has the weight ratios of elements of 0.05 to 5 parts by weight of aluminum (Al) atom and 0.05 to 5 parts by weight of silicon (Si) atom based on 100 parts by weight of iron (Fe) atom.

11. The medium described in any of the above 1 to 10 wherein the ferromagnetic powder contained in the upper layer is ferromagnetic metallic powder.

12. The medium described in any of the above 1 to 11 wherein the lower layer is a non-magnetic layer.
13. The medium described in any of the above 1 to 12 wherein the α-iron oxide powder contained in the lower layer has an acicular shape.
14. The medium described in any of the above 1 to 13 wherein the upper layer has a dry film thickness of 0.05 to 1.0 μm and the lower layer has a dry film thickness of 0.1 to 3.0 μm.
15. The medium of above 13, wherein a longer axis diameter of the α-iron oxide powder is less than 0.30 μm.
16. The medium of above 13, wherein an acicular ratio of the α-iron oxide powder is 2 to 20.
17. The medium of above 1, wherein the content of the α-iron oxide powder in the lower layer is 50 to 99% by weight based on the total amount of the components constituting the lower layer
18. The medium of above 11, wherein the ferromagnetic metallic powder contains Fe, Al and a rare earth element.
19. The medium of above 18, wherein the rare earth element is selected from the group consisting of samarium (Sm), neodymium (Nd), yttrium (Y) and praseodymium (Pr).

DESCRIPTION OF THE PREFERRED EMBODIMENTS

In the following, the magnetic recording medium of the present invention is explained in detail.

Constitution of magnetic recording medium

The magnetic recording medium of the present invention comprises a non-magnetic support (A) and a magnetic layer comprising a layer containing α-iron oxide powder as a lower layer (B) and a layer containing ferromagnetic powder as an upper layer (C) which are provided on the non-magnetic support (A) in this order from a side of the non-magnetic support (A). Also, the magnetic recording medium of the present invention may further comprise a magnetic layer and/or a non-magnetic layer containing non-magnetic powder between the lower layer (B) and the upper layer (C) or between the non-magnetic support (A) and the lower layer (B). For example, a layer provided between the lower layer (B) and the upper layer (C) or between the non-magnetic support (A) and the lower layer (B) may comprise either plural non-magnetic layers or plural layers having a magnetic layer and a non-magnetic layer.

In the present invention, the dry film thickness of the upper layer is preferably 0.05 to 1.0 μm, more preferably 0.10 to 0.60 μm, further preferably 0.10 to 0.30 μm. The dry film thickness of the lower layer is preferably 0.1 to 3.0 μm, more preferably 0.2 to 2.0 μm, further preferably 0.5 to 2.0 μm.

(A) Non-magnetic support

As a material for forming the non-magnetic support, there may be mentioned, for example, polyesters such as a polyethylene terephthalate, a polyethylene-2,6-naphthalate, etc., polyolefins such as a polypropylene, etc., cellulose derivatives such as cellulose triacetate, cellulose diacetate, etc. and plastics such as a polyamide, a polycarbonate, etc.

The shape of the non-magnetic support is not particularly limited and may have a tape shape, a film shape, a sheet shape, a card shape, a disk shape, a drum shape, etc.

The thickness of the non-magnetic support is not particularly limited, but it is generally 3 to 100 μm, preferably 4 to 50 μm in the case of a film shape or a sheet shape and about 30 μm to 10 mm in the case of a disk shape or a card shape and may be selected optionally depending on a recorder, etc. in the case of a drum shape.

The non-magnetic support may have a single layer structure or a multilayer structure. The non-magnetic support may be subjected to surface treatment such as corona discharge treatment, etc.

Further, on a surface (back surface) of the non-magnetic support, on which the magnetic layer is not provided, a back coat layer is preferably provided for the purposes of improving runnability of the magnetic recording medium and preventing static charge and transfer thereof. A subbing layer may be also provided between the magnetic layer and the non-magnetic support.

(B) Lower layer

The lower layer is not particularly limited except that it is a layer containing the α-iron oxide powder, and may be formed by using various methods. As the α-iron oxide powder, α-$Fe_2O_3$ powder is preferred.

The lower layer contains the α-iron oxide powder and a binder, and may further contain other components. In the present invention, the lower layer is preferably a non-magnetic layer. Here, the term "non-magnetic" means a magnetic property of such a degree which does not affect to the magnetic recording originally intended.

In the present invention, in addition to the α-iron oxide powder described above, various conventionally known non-magnetic powders other than the α-iron oxide powder of the present invention may be optionally selected and used.

As non-magnetic powder which can be used, there may be mentioned, for example, carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, α-$Al_2O_3$, α-FeOOH, SiC, cerium oxide, corundum, artificial diamond, α-iron oxide (α-$Fe_2O_3$, etc.), garnet, quartz rock, silicon nitride, boron nitride, silicon carbide, molybdenum carbide, boron carbide, tungsten carbide, titanium carbide, tripoli, a diatomaceous earth, dolomite, etc.

Of these materials, preferred are inorganic powder such as carbon black, $CaCO_3$, $TiO_2$, barium sulfate, α-$Al_2O_3$, α-FeOOH, $Cr_2O_3$, etc. and polymer powder such as polyethylene, etc.

In the present invention, it is preferred to use α-iron oxide powder having an acicular shape. When acicular shaped powder is used, smoothness of the surface of the lower layer can be improved whereby smoothness of the surface of the upper layer laminated thereon can be also improved.

The longer axis diameter of the α-iron oxide powder is generally less than 0.30 μm, preferably 0.20 μm or less, particularly preferably 0.15 μm or less.

The shorter axis diameter of the α-iron oxide powder is generally 0.10 μm or less, preferably 0.08 μm or less, particularly preferably 0.06 μm or less.

The acicular ratio of the α-iron oxide powder is generally 2 to 20, preferably 5 to 15, particularly preferably 5 to 10. The acicular ratio herein mentioned means the ratio of the longer axis diameter to the shorter axis diameter (the longer axis diameter/the shorter axis diameter).

The specific surface area of the α-iron oxide powder is generally 10 to 250 $m^2$/g, preferably 20 to 150 $m^2$/g, particularly preferably 30 to 100 $m^2$/g. The method of measuring the specific surface area is the same as the method for measuring the specific surface area (BET method) of the magnetic particles as described below.

When the α-iron oxide powder having a longer axis diameter, a shorter axis diameter, an acicular ratio and a specific surface area in the above ranges is used, surface characteristics of the lower layer are good and also surface characteristics of the upper layer are good.

The content of the α-iron oxide powder in the lower layer is 50 to 99% by weight, preferably 60 to 95% by weight, particularly preferably 70 to 95% by weight based on the total amount of all components constituting the lower layer. When the content of the α-iron oxide powder is in the above range, states of coating film surfaces of the lower layer and the upper layer are good.

The average existence ratio of element(s) forming the surface of the α-iron oxide powder which are present in the lower layer coating film of the present invention can be measured by using a XPS surface analyzer.

Next, the method is explained. The XPS surface analyzer was set under the conditions as mentioned below.

X-ray anode; Mg

Resolution; 1.5 to 1.7 eV (The resolution was regulated by a half-value width of a clean Ag3d5/2 peak).

The XPS surface analyzer is not specifically limited and any device may be used, but in the present invention, ESCALAB-200R (trade name) manufactured by VG Co. was used.

Narrow scan was carried out in the measurement range as mentioned below to measure respective spectra of each element. At this time, an intake span of the data was set 0.2 eV, and it was necessary to integrate the desired peak until a count not less than the minimum count shown below can be obtained.

| Peak | Measured range (Binding energy eV) | Minimum detection intensity (count) |
|---|---|---|
| C1s | 305 to 280 | Optional |
| Fe2p3/2 | 730 to 700 | 600,000 |
| Na (KL$_{23}$L$_{23}$) Auger peak | 280 to 250 | 600,000 |

The obtained spectra were corrected their energy positions so as to become the C1s peak position to 284.6 eV.

Next, to effect a processing on COMMON DATA PROCESSING SYSTEM Ver. 2.3 (hereinafter abbreviated to "VAMAS soft") prepared by VAMAS-SCA-JAPAN, the above spectra were transferred to a computer which is capable of using the VAMAS soft by using a soft provided by respective manufacturers of a device. Then, after converting the transferred spectra to a VAMAS format by using the VAMAS soft, processing of data was carried out.

Before effecting quantitative processing, calibration of Count Scale was carried out for respective elements and five points smoothing treatment was carried out. By making the peak positions of the respective elements center portions, peak area intensities (cps*eV) were obtained with the quantitative range as shown in the following table. By using the sensitivity coefficients shown below, numbers of atoms of the respective elements were calculated. The number of atoms was calculated based on 100 atoms of Fe and was made a quantitative value.

| Element | Peak position (B.E.: eV) | Quantitative range (B.E.: eV) | Sensitivity coefficient |
|---|---|---|---|
| Fe | at about 719.8 | High B.E.side: 5 eV, Low B.E.side: 7 eV | 10.54 |
| Na | at about 264.0 | High B.E.side: 2 eV, Minimal value around there Low B.E.side: 6 eV | 7.99 |

Except for the above elements, they were measured according to the following conditions.

TABLE 1

<Measurement conditions of surface composition of α-iron oxide powder in lower layer coating film>

| Element | Measured range (B.E.) | Minimum count number | Quantitative range (values from the peak position) | Sensitivity coefficient |
|---|---|---|---|---|
| Nd | 244–220 | 50,000 | High B.E.Side: 6 eV Low B.E.Side: 6 eV | 2.710 |
| Y | 172–152 | 100,000 | High B.E.Side: 6 ev Low B.E.Side: 5 eV | 6.240 |
| La | 854–830 | 1,000,000 | High B.E.Side: 9 eV Low B.E.Side: 6 eV | 26.490 |
| Si | 165–145 | 60,000 | High B.E.Side: 5 eV Low B.E.Side: 6 eV | 0.855 |
| Al | 88–68 | 50,000 | High B.E.Side: 4 eV Low B.E.Side: 4 ev | 0.570 |
| Ca | 366–342 | 100,000 | High B.E.Side: 10 eV Low B.E.Side: 5 eV | 5.130 |
| Ba | 808–790 | 1,000,000 | High B.E.Side: 5 eV Low B.E.Side: 5 eV | 17.040 |
| Sr | 150–130 | 300,000 | High B.E.Side: 5 eV Low B.E.Side: 4 eV | 5.290 |
| P | 150–125 | 100,000 | High B.E.Side: 6 eV Low B.E.Side: 6 eV | 1.250 |

<Method for preparing samples>

Before effecting the above measurements, a pre-treatment of a medium (magnetic tape) was carried out.

A binder resin was removed from a magnetic tape by a plasma low temperature ashing treatment method to expose α-iron oxide particles. As to the conditions of the processing method, those in which the binder resin is ashed but the α-iron oxide particles are not damaged are selected. For example, after processing with the device and processing conditions as mentioned below, average existence ratios of elements forming the surface of the α-iron oxide powder, to which the powder in the lower layer coating film was carried out, were measured.

Device: PL-850X (Trade name) manufactured by Meiwa Shoji Co.

| Processing conditions: |
|---|
| FORWARD POWER 100 W REFLECTED POWER 5 W Vacuum degree 10 Pa Kind of introduced gas Air Discharged time 1 min |

Also, weight ratios of elements based on the whole amount of the α-iron oxide powder of the present invention were obtained by using a wavelength dispersion type fluorescent X-ray analyzer (WDX), after measuring a fluorescent X-ray intensity of respective elements, and effecting a calculation according to the fundamental parameter method (hereinafter abbreviated to "FP method").

For measurement of the fluorescent X-ray, WDX system 3080 (trade name) manufactured by Rigaku Denki Co. was used under the following conditions.

X-ray tube: Rhodium tube

Output: 50 KV, 50 mA

Spectral crystal: LiF (with regard to Fe, Co, Ni, Nd, La, Y, Sr, Ca and Ba), PET (with regard to Al), RX-4 (with regard to Si) and RX-40 (with regard to Na)

Apsorber/Al: 1/1 (with regard to Fe: 1/10)

Slit: COARSE

Filter: OUT

PHA: 15 to 30 (with regard to Al, Si, Na and P), 10 to 30 (with regard to Fe, Co, Ni, Nd, La, Y, Sr, Ca and Ba)

Count time: peak=40 sec, background=40 sec (two points before and after peak were measured)

For effecting the measurement by fluorescent X-ray, the devices to be used are not limited by the device as mentioned above and various devices may be used.

As the standard samples, the following eight metal compounds were used.

Standard sample 1 is an alloy SRM 1219 (containing 0.15% by weight of C, 0.42% by weight of Mn, 0.03% by weight of P, 0.55% by weight of Si, 0.16% by weight of Cu, 2.16% by weight of Ni, 15.64% by weight of Cr, 0.16% by weight of Mo and 0.06% by weight of V, respectively) produced by Analytical Reference Materials International Co.

Standard sample 2 is an alloy SRM 1250 (containing 37.78% by weight of Ni, 0.08% by weight of Cr, 0.01% by weight of Mo, 16.10% by weight of Co and 0.99% by weight of Al, respectively) produced by Analytical Reference Materials International Co.

Standard sample 3 is magnetic iron oxide powder (containing 0.14% by weight of Mn, 0.15% by weight of P, 0.19% by weight of S, 0.36% by weight of Si, 3.19% by weight of Co, 1.26% by weight of Zn, 0.07% by weight of Ca and 0.02 by weight of Na, respectively).

Standard sample 4 is ferromagnetic metallic powder (containing 2.73% by weight of Nd and 0.001% by weight of Na).

Standard sample 5 is ferromagnetic metallic powder (containing 0.97% by weight of Sr).

Standard sample 6 is ferromagnetic metallic powder (containing 1.40% by weight of Ba and 0.40% by weight of Ca).

Standard sample 7 is ferromagnetic metallic powder (containing 2.69% by weight of La).

Standard sample 8 is ferromagnetic metallic powder (containing 1.98% by weight of Y).

The values of % by weights of elements in the above Standard samples 1 and 2 are values in the data sheet offered by the manufacturer, and those of the above Standard samples 3 to 8 are analytical values measured by an ICP fluorescent analyzer. The values are input as a compositional value of elements in Standard samples in the following calculations by the FP method. For calculation of the FP method, Fundamental Parameter Software Version 2.1 prepared by TECHNOS Co. was used and calculation was carried out by the following conditions.

Sample model: Bulk sample

Balance component sample: Fe

Input component: Measured X-ray intensity (KCPS)

Analysis unit: % by weight

Weight ratios of respective elements calculated were converted as % by weight of other elements based on 100% by weight of Fe to make the values quantitative values.

Further, average existence ratio of compositional elements at the surface of the α-iron oxide powder can be obtained by the method as mentioned below.

As for the average existence ratio of respective elements, Fe, Si, Al, Sr, Ca, Ba and Na in the composition at the surface of the α-iron oxide powder, these values were obtained by using the XPS surface analyzer.

In the following, the method is explained.

First, the XPS surface analyzer was set at the following conditions.

X-ray anode; Mg

Resolution; 1.5 to 1.7 eV (The resolution was regulated by a half-value width of a clean Ag 3d5/2 peak).

For fixing the sample, the so-called adhesive tape was not used. The kind of the XPS surface analyzer is not specifically limited and various devices may be used, but in the present invention, ESCALAB-200R (trade name) manufactured by VG Co. was used.

Narrow scan was carried out in the measurement range as mentioned below to measure respective spectra of each element. At this time, an intake span of the data was set 0.2 eV, and the desired peak was integrated until a count not less than the minimum count shown in Table 2 was obtained.

The obtained spectra were corrected their energy positions so as to become the C peak position to 284.6 eV.

Next, to effect a processing on COMMON DATA PROCESSING SYSTEM Ver. 2.3 (hereinafter abbreviated to "VAMAS soft") prepared by VAMAS-SCA-JAPAN, the above spectra were transferred to a computer which is capable of using the VAMAS soft by using a soft provided by respective manufacturers of a device.

Then, after converting the transferred spectra to a VAMAS format by using the VAMAS soft, processing of data was carried out.

Before effecting quantitative processing, calibration of Count Scale was carried out for respective elements and five points smoothing treatment was carried out.

The quantitative processing is as follows.

By making the peak positions of the respective elements center portions, peak area intensities were obtained with the quantitative range as shown in the following table. By using the sensitivity coefficients shown in the following table, atom number %'s of the respective elements were calculated. The number of atoms was calculated based on 100 atoms of Fe and was made a quantitative value.

TABLE 2

<Measurement conditions of surface composition of α-iron oxide powder>

| Element | Measured range (B.E.) | Minimum count number | Quantitative range (values from the peak position) | Sensitivity coefficient |
|---|---|---|---|---|
| Fe | 725–700 | 1,000,000 | High B.E.Side: 6 eV Low B.E.Side: 7 eV | 10.540 |
| Co | 800–770 | 1,000,000 | High B.E.Side: 12 eV Low B.E.Side: 8 eV | 12.200 |
| Ni | 875–845 | 300,000 | High B.E.Side: 15 eV Low B.E.Side: 6 eV | 13.920 |
| Nd | 244–220 | 50,000 | High B.E.Side: 6 eV Low B.E.Side: 6 eV | 2.710 |
| Y | 172–152 | 100,000 | High B.E.Side: 6 eV Low B.E.Side: 5 eV | 6.240 |
| La | 854–830 | 1,000,000 | High B.E.Side: 9 eV Low B.E.Side: 6 eV | 26.490 |
| Si | 165–145 | 60,000 | High B.E.Side: 5 eV Low B.E.Side: 6 eV | 0.855 |
| Al | 88–68 | 50,000 | High B.E.Side: 4 eV Low B.E.Side: 4 eV | 0.570 |
| Ca | 366–342 | 100,000 | High B.E.Side: 10 eV Low B.E.Side: 5 eV | 5.130 |
| Ba | 808–790 | 1,000,000 | High B.E.Side: 5 eV Low B.E.Side: 5 eV | 17.040 |

TABLE 2-continued

<Measurement conditions of surface composition of α-iron oxide powder>

| Element | Measured range (B.E.) | Minimum count number | Quantitative range (values from the peak position) | Sensitivity coefficient |
|---|---|---|---|---|
| Sr | 150–130 | 300,000 | High B.E.Side: 5 eV Low B.E.Side: 4 eV | 5.290 |
| Na | 1088–1060 | 1,500,000 | High B.E.Side: 4 eV Low B.E.Side: 5 eV | 7.990 |
| P | 150–125 | 100,000 | High B.E.Side: 6 ev Low B.E.Side: 6 eV | 1.250 |

In the present invention, an α-iron oxide powder wherein the surface of which has the average existence ratios of elements of 0 to 40 of aluminum (Al) atom and 1 to 60 of silicon (Si) atom based on the number of iron (Fe) atom as 100 in terms of the number of atoms is contained in the lower layer.

The α-iron oxide powder preferably has the average existence ratios of elements of 0 to 10 of Al atom, 1 to 40 of Si atom and 1 to 70 of P atom based on the number of Fe atom as 100 in terms of the number of atoms, or has the average existence ratios of elements of 1 to 40 of Al atom, 1 to 40 of Si atom and 1 to 30 of alkaline earth elements atom based on the number of Fe atom as 100 in terms of the number of atoms, more preferably has the average existence ratios of elements of 0 to less than 5 of Na atom based on the number of Fe atom as 100 in terms of the number of atoms, or has the average existence ratios of elements of 0 to less than 5 of Na atom based on the number of Fe atom as 100 in terms of the number of atoms, and further preferably has the weight ratios of elements of 0.05 to 5 parts by weight of Al atom and 0.05 to 5 parts by weight of Si atom based on 100 parts by weight of Fe atom; has the weight ratios of elements of 0.05 to 2 parts by weight of Al atom, 0.05 to 2 parts by weight of Si atom and 0.2 to 5 parts by weight of P atom based on 100 parts by weight of Fe atom; has the weight ratios of elements of 0.05 to 2 parts by weight of Al atom, 0.05 to 2 parts by weight of Si atom, 0.2 to 5 parts by weight of P atom and 0 to 0.05 part by weight of Na atom based on 100 parts by weight of Fe atom; has the weight ratios of elements of 0.2 to 5 parts by weight of Al atom, 0.2 to 5 parts by weight of Si atom and 0.2 to 5 parts by weight of alkaline earth elements atom based on 100 parts by weight of Fe atom; or has the weight ratios of elements of 0.2 to 5 parts by weight of Al atom, 0.2 to 5 parts by weight of Si atom, 0 to less than 0.05 part by weight of Na atom and 0.2 to 5 parts by weight of alkaline earth elements atom based on 100 parts by weight of Fe atom.

Here, the surface of the α-iron oxide powder means the range which is detectable using the XPS surface analyzer as mentioned above.

A method for preparing the α-iron oxide powder of the present invention is common irrespective of its shape (sperical, acicular, etc.). Here, a method for preparing an acicular shaped α-iron oxide powder is explained as a representative example.

In the acicular shaped $\alpha\text{-Fe}_2\text{O}_3$ powder of the present invention, an iron oxyhydroxide obtained by blowing an oxidative gas into an aqueous suspension in which a ferrous salt and an alkali are mixed is used as a starting material. As a kind of the iron oxyhydroxide, α-FeOOH is preferred, and as a preparation method thereof, there may be mentioned a method in which a ferrous salt is neutralized with an alkaline hydroxide to prepare an aqueous suspension of $\text{Fe(OH)}_2$, and an oxidative gas is blown into the suspension to obtain acicular-shaped α-FeOOH. Also, there may be mentioned a method in which a ferrous salt is neutralized with an alkaline carbonate to prepare an aqueous suspension of $\text{FeCO}_3$, and an oxidative gas is blown into the suspension to obtain sprindle-shaped α-FeOOH. In the present invention, the latter method is more preferred.

As the iron oxyhydroxide, preferred is an iron oxyhydroxide obtained by reacting a ferrous salt aqueous solution and an alkaline aqueous solution to obtain an aqueous solution containing ferrous hydroxide and oxidizing the aqueous solution with air oxidation or the like. In the ferrous salt aqueous solution, a salt of an alkaline earth element such as a Ni salt, a Ca salt, a Ba salt, a Sr salt, a Mg salt, etc., a Cr salt, a Zn salt, a phosphor compound, etc. may coexist, and by selecting and using such a salt suitably, a particle shape (acicular ratio), etc. can be desirably controlled.

The ferrous salt is preferably ferrous chloride, ferrous sulfate, ferrous nitrate, etc. The alkali is preferably NaOH, $\text{NH}_4\text{OH}$, $(\text{NH}_4)_2\text{CO}_3$, $\text{Na}_2\text{CO}_3$, etc. The salts are preferably chlorides. The Ni salt is preferably nickel chloride, etc., the salts of Ca, Ba, Sr, Mg, etc., preferably include chlorides such as calcium chloride, barium chloride, strontium chloride, magnesium chloride, etc., and the salts of Cr and Zn may preferably include chromium chloride, zinc chloride, etc., respectively.

Next, introduction of Al and/or Si is explained below. The first method is to add an aqueous solution containing the Al compound and/or the Si compound to the aforesaid slurry, and the mixture is stirred and mixed. The thus prepared slurry is sufficiently filtered, washed with water, dried and then subjected to heat treatment under non-reductive atmosphere at a temperature of 300° to 800° C. to obtain $\alpha\text{-Fe}_2\text{O}_3$ powder. If the heat treatment temperature is lower than 300° C., the number of pores formed in $\alpha\text{-Fe}_2\text{O}_3$ powder by dehydration of α-FeOOH are increased, whereby dispersibility of the $\alpha\text{-Fe}_2\text{O}_3$ powder is lowered. If the heat treatment temperature is higher than 800° C., melting of α-Fe$_2$O$_3$ particles starts to change a shape of the particles, or sintering proceeds, whereby characteristics of the resulting $\alpha\text{-Fe}_2\text{O}_3$ powder are worsened. The second method is that the above slurry is sufficiently washed, dried and then subjected to heat treatment under non-reductive atmosphere at a temperature of 300° to 800° C. to obtain $\alpha\text{-Fe}_2\text{O}_3$ powder. Then, the thus prepared $\alpha\text{-Fe}_2\text{O}_3$ powder is dispersed in water to obtain an aqueous suspension, and then an Al compound and/or a Si compound is/are added to the suspension and the suspension is stirred and mixed. Thereafter, by subjecting to filtration, washing with water, drying, pulverization, deaeration, etc., to obtain $\alpha\text{-Fe}_2\text{O}_3$.

As the Al compound to be used, there may be mentioned sodium aluminate, sodium metaaluminate, etc. and as the Si compound, there may be mentioned sodium silicate, etc.

By using the methods as described above, amounts of Al, Si, P, an alkaline earth element and Na contained in the $\alpha\text{-Fe}_2\text{O}_3$ powder are controlled in the range claimed in the claims of the invention.

If the amounts of the Al atom and Si atom in the total composition or the existance ratios thereof on the surface of the $\alpha\text{-Fe}_2\text{O}_3$ powder are out of the claimed range, adhesiveness of the $\alpha\text{-Fe}_2\text{O}_3$ powder and the binder cannot be maintained so that dispersibility is worsened, and as the result, smoothness of the lower layer is worsened whereby the smoothness of the magnetic layer (upper layer) is also worsened. Further, if the amounts of the alkaline earth element atom, P atom and Na atom in the total composition or existance ratios thereof on the surface of the $\alpha$-$Fe_2O_3$ powder are out of the claimed range, an acicular property of the $\alpha$-$Fe_2O_3$ powder is worsened. For example, the particles are sintered or branched at the heat treatment, or lowering in acicular shape causes lowering in dispersibility or smoothness due to ununiformity of the shape.

As the binder to be used in the lower layer of the present invention, there may be representatively mentioned, for example, a polyurethane, a polyester and a vinyl chloride type resin such as a vinyl chloride type copolymer, etc. These resins preferably have a recurring unit having at least one polar group selected from the group consisting of —$SO_3M$, —$OSO_3M$, —COOM, —$PO(OM^1)_2$ and a sulfobetaine group.

In the above polar groups, M represents a hydrogen atom or an alkali metal such as sodium (Na), potassium (K), lithium (Li), etc., and $M^1$ represents a hydrogen atom, an alkali metal such as Na, K, Li, etc. or an alkyl group.

In the present invention, as a binder of the lower layer, the following resin may be used in combination in an amount of 20 to 80% by weight based on the amount of all binders.

As the resin, there may be mentioned a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, a cellulose derivative (nitrocellulose, etc.), a styrene-butadiene copolymer, a phenol resin, an epoxy resin, a urea resin, a melamine resin, a phenoxy resin, a silicone resin, an acrylic resin, a urea formamide resin, various synthetic rubber type resins, etc. all of which have a weight average molecular weight of 10,000 to 200,000.

In the present invention, in order to improve quality of the lower layer, additives such as an abrasive, a lubricant, a hardener, a dispersant, an antistatic agent, conductive fine powder, etc. may be contained as other components.

As the abrasive, there may be used, for example, a known compound disclosed in the paragraph number of [0105] of Japanese Provisional Patent Publication No. 214218/1992. The average particle size of the abrasive is generally 0.05 to 0.6 μm, preferably 0.05 to 0.5 μm, particularly preferably 0.05 to 0.3 μm.

The abrasive is contained in the lower layer generally in an amount of 3 to 20 parts by weight, preferably 5 to 15 parts by weight based on 100 parts by weight of the $\alpha$-$Fe_2O_3$.

As the lubricant, an aliphatic acid and/or an aliphatic acid ester may be used. In this case, the aliphatic acid is added preferably in an amount of 0.2 to 10 parts by weight, particularly preferably 0.5 to 5 parts by weight based on the amount of the magnetic powder or the non-magnetic powder. When a lubricating effect is desired to be more heightened by using the aliphatic acid and the aliphatic acid ester in combination, the aliphatic acid and the aliphatic acid ester are preferably used at a weight 10 ratio of 10:90 to 90:10. The aliphatic acid may be either a monobasic acid or a dibasic acid and preferably have 6 to 30 carbon atoms, more preferably 12 to 24 carbon atoms.

As a specific example of the aliphatic acid, there may be mentioned an aliphatic acid disclosed in the paragraph number of [0102] of Japanese Provisional Patent Publication No. 214218/1992, and as a specific example of the aliphatic acid ester, there may be mentioned an aliphatic acid ester disclosed in the paragraph number of [0103] of the above publication.

As a lubricant other than the above aliphatic acid and aliphatic acid ester, there may be used a known compound, for example, silicone oil, fluorinated carbon, aliphatic acid amide, $\alpha$-olefin oxide, etc.

As the hardener, there may be mentioned a polyisocyanate. As the polyisocyanate, there may be mentioned, for example, an aromatic polyisocyanate such as an adduct of tolylene diisocyanate (TDI), etc. and an active hydrogen compound, etc. and an aliphatic polyisocyanate such as an adduct of hexamethylene diisocyanate (HMDI), etc. and an active hydrogen compound, etc. The weight average molecular weight of the above polyisocyanate is desirably in the range of 100 to 3,000.

As the dispersant, there may be mentioned compounds disclosed in the paragraph number of [0093] of the above publication. These dispersants are generally used in an amount of 0.5 to 5% by weight based on the amount of the magnetic powder or the non-magnetic powder.

As the antistatic agent, there may be mentioned a surfactant disclosed in the paragraph number of [0107] of the above publication. This antistatic agent is generally added in an amount of 0.01 to 40% by weight based on the amount of the binder. Further, in the present invention, conductive fine powder is preferably used as an antistatic agent. As the above antistatic agent, there may be mentioned a pigment (e.g., carbon black, graphite, tin oxide, silver powder, silver oxide, silver nitrate, an organic compound of silver, a metallic particle such as copper powder and a metal oxide such as zinc oxide, barium sulfate and titanium oxide) subjected to coating treatment using a conductive material such as a tin oxide film or an antimony melted-(solid-solution) tin oxide film.

The average particle size of the above conductive fine powder is 5 to 700 nm, preferably 5 to 200 nm. The conductive fine powder is contained in an amount of 1 to 20 parts by weight, preferably 2 to 7 parts by weight based on 100 parts by weight of the $\alpha$-iron oxide powder.

(C) Upper layer

The upper layer is not particularly limited except that it is a layer containing ferromagnetic powder, and may be formed by using various methods. The upper layer may contain a binder and other components.

As the ferromagnetic powder to be used in the present invention, there may be mentioned ferromagnetic iron oxide powder, ferromagnetic metallic powder, hexagonal plate powder, etc.

Above all, ferromagnetic metallic powder described below may be suitably used.

As the above ferromagnetic iron oxide powder, there may be mentioned $\gamma$-$Fe_2O_3$, $Fe_3O_4$, intermediate iron oxide thereof represented by $FeO_x$ ($1.33<x<1.5$), ferromagnetic iron oxide powder to which cobalt (Co) is added (modified by Co) represented by Co—$FeO_x$ ($1.33<x<1.5$), etc.

As the ferromagnetic metallic powder, there may be mentioned ferromagnetic metallic powder such as Fe, Co, Fe—Al type, Fe—Al—Ni type, Fe—A;—Zn type, Fe—Al—Co type, Fe—Al—Ca type, Fe—Ni type, Fe—Ni—Al type, Fe—Ni—Co type, Fe—Ni—Si—Al type, Fe—Ni—Si—Al—Co (or Ca) type, Fe—Ni—Si—Al—Mn type, Fe— Ni—Si—Al—Zn type, Fe—Al—Si type, Fe—Ni—Zn type, Fe—Ni—Mn type, Fe—Ni—Si type, Fe—Mn—Zn type, Fe—Co—Ni—P type, Ni—Co type metallic powders and metallic magnetic powder containing Fe, Ni, Co, etc. as a main component. Of these, Fe type metallic powder is excellent in electric characteristics.

On the other hand, from the points of corrosion resistance and dispersibility, preferred are Fe—Al type ferromagnetic metallic powders such as Fe—Al type, Fe—Al—Ca type, Fe—Al—Ni type, Fe—Al—Zn type, Fe—Al—Co type, Fe—Ni—Si—Al—Co type and Fe—Co—Al—Ca type ferromagnetic metallic powders, etc.

The ferromagnetic metallic powder particularly preferred for accomplishing the object of the present invention is metallic magnetic powder containing iron as a main component and desirably containing Al or Al and Ca with a weight ratio of Fe:Al=100:0.5 to 100:20 and a weight ratio of Fe:Ca=100:0.1 to 100:10.

By making the ratio of Fe:Al in the above range, corrosion resistance can be improved significantly, and by making the ratio of Fe:Ca in the above range, electromagnetic transfer characteristics can be improved and dropout can be reduced.

The reasons why electromagnetic transfer characteristics can be improved and dropout can be reduced are not certain. However, as the reasons, there may be considered increase in coercive force, reduction of agglomerates, etc. brought about by improving dispersibility.

The ferromagnetic powder to be used in the present invention has a longer axis diameter preferably of less than 0.30 μm, more preferably 0.06 to 0.20 μm, further preferably 0.06 to 0.17 μm. If the longer axis diameter of the ferromagnetic powder is in the above range, surface characteristics of the magnetic recording medium can be improved and also electromagnetic transfer characteristics thereof can be improved.

The crystallite size is 100 to 200 Å and the acicular ratio is 4 to 15.

Further, the ferromagnetic powder to be used in the present invention preferably has a coercive force (Hc) in the range of 1,200 to 5,000 Oe. If the coercive force is less than 1,200 Oe, electromagnetic transfer characteristics may be lowered, while if the coercive force exceeds 5,000 Oe, recording using a common magnetic head may not be carried out.

The ferromagnetic powder preferably has a saturation magnetization ($\sigma_s$) which is a magnetic characteristic being 110 emu/g or more. If the saturation magnetization is less than 110 emu/g, electromagnetic transfer characteristics may be lowered. It is more preferred that the saturation magnetization is 125 emu/g or more.

Further, in the present invention, in order to cope with higher density of recording, it is preferred to use ferromagnetic metallic powder having a specific surface area measured by the BET method of 30 m$^2$/g or more, particularly 45 m$^2$/g or more.

With regard to the specific surface area and the method for measuring the same have been described in detail in "Measurement of Powder Material", written by J. M. Dallavelle and Clyeorr Jr., translated by Muta et al., published by Sangyo Toshosha, Japan, and also described in "Chemical Handbook" Applied Chemistry, pp. 1170 to 1171 (Edited by The Chemical Society of Japan, published by Maruzen Co., on Apr. 30, 1966).

The specific surface area is measured by, for example, deaerating powder while heating at about 105° C. for 13 minutes to remove substances absorbed in the powder, then introducing the powder into a measurement device, setting an initial pressure of nitrogen at 0.5 kg/m$^2$ and carrying out measurement at a liquid nitrogen temperature (–105° C.) by nitrogen for 10 minutes.

As the measurement device, there may be used, for example, Quantasorb (trade name, produced by Yuasa Ionics Co.).

As more preferred ferromagnetic metallic powder, there may be mentioned:

① the ferromagnetic metallic powder containing Fe, Al and at least one rare earth element selected from the group consisting of Sm, Nd, Y and Pr as constitutional elements;

② the ferromagnetic metallic powder in which existence ratios of Fe, Al and at least one rare earth element selected from the group consisting of Sm, Nd, Y and Pr in the whole composition are 2 to 10 parts by weight of Al atom and 1 to 8 parts by weight of the rare earth element(s) based on 100 parts by weight of Fe atom; and existence ratios of Fe, Al and the rare earth element(s) in terms of the number of atoms existing at the surface thereof are 70 to 200 of Al atom and 0.5 to 30 of the rare earth element(s) based on the number of Fe atom as 100;

③ the ferromagnetic metallic powder in which Na and Ca are further contained as constitutional elements; existence ratios of Fe, Al, at least one rare earth element selected from the group consisting of Sm, Nd, Y and Pr, Na and Ca in the whole composition are 2 to 10 parts by weight of Al atom, 1 to 8 parts by weight of the rare earth element(s), less than 0.1 part by weight of Na atom and 0.1 to 2 parts by weight of Ca atom based on 100 parts by weight of Fe atom; and existence ratios of Fe, Al, the rare earth element(s), Na and Ca in terms of the number of atoms existing at the surface thereof are 70 to 200 of Al atom, 0.5 to 30 of the rare earth element(s), 0.1 to 30 of Na atom and 5 to 30 of Ca atom based on the number of Fe atom as 100; and ④ the ferromagnetic metallic powder in which Co, Ni and Si are further contained as constitutional elements; existence ratios of Fe, Co, Ni, Al, Si, at least one rare earth element selected from the group consisting of Sm, Nd, Y and Pr, Na and Ca in the whole composition are 2 to 20 parts by weight of Co atom, 2 to 20 parts by weight of Ni atom, 2 to 10 parts by weight of Al atom, 0.3 to 5 parts by weight of Si atom, 1 to 8 parts by weight of the rare earth element(s), less than 0.1 part by weight of Na atom and 0.1 to 2 parts by weight of Ca atom based on 100 parts by weight of Fe atom; and existence ratios of Fe, Co, Ni, Al, Si, the rare earth element(s), Na and Ca in terms of the number of atoms existing at the surface thereof are less than 0.1 of Co atom, less than 0.1 of Ni atom, 70 to 200 of Al atom, 20 to 130 of Si atom, 0.5 to 30 of the rare earth element(s), 0o1 to 30 of Na atom and 5 to 30 of Ca atom based on the number of Fe atom as 100.

As a binder to be contained in the upper layer containing the ferromagnetic powder, there may be used the same binder to be used in the lower layer.

The binder is contained in the upper layer generally in an amount of 10 to 40 parts by weight, preferably 10 to 30 parts by weight based on 100 parts by weight of the ferromagnetic powder.

As other components which can be contained in the upper layer, there may be used the same components which can be contained in the lower layer.

A lubricant is contained preferably in an amount of 0.2 to 10% by weight, more preferably 0.5 to 5% by weight based on the amount of the ferromagnetic powder.

A dispersant is contained in an amount of 0.5 to 5% by weight based on the amount of the ferromagnetic powder.

Conductive fine powder is contained generally in an amount of 1 to 20 parts by weight, preferably 3 to 15 parts by weight based on 100 parts by weight of the ferromagnetic powder.

In the magnetic recording medium of the present invention, the magnetic layer is preferably provided by coating according to the so-called wet-on-wet coating system in which a magnetic layer is provided by coating while a lower layer is in a wet state. As the wet-on-wet coating system, there may be suitably selected a known method used for preparing a magnetic recording medium having a multilayer structure.

For example, in general, magnetic powder, a binder, a dispersant, a lubricant, an abrasive and an antistatic agent and a solvent are kneaded to prepare a high concentration magnetic coating, the high concentration magnetic coating is diluted to prepare a magnetic coating and then the magnetic coating is coated on the surface of a non-magnetic support. As the above solvent, there may be used solvents disclosed in the paragraph number of [0119] of Japanese Provisional Patent Publication No. 21418/1992. These various solvents may be used singly or in combination of two or more of them.

When the components for forming the magnetic layer are kneaded, various kneading and dispersing machines can be used. As the kneading and dispersing machine, there may be mentioned a kneading and dispersing machine disclosed in the paragraph number of [0112] of the above publication.

Among the kneading and dispersing machines, kneading and dispersing machines which can provide a load of consumed electric power of 0.05 to 0.5 KW (per 1 kg of the magnetic powder) are a pressure kneader, an open kneader, a continuous kneader, a twin roll mill and a triple roll mill.

When the coating is coated, a combination of a reverse roll and an extrusion coater, a combination of a gravure roll and an extrusion coater, etc. may be used in the wet-on-wet coating system. Further, an air doctor coater, a blade coater, an air knife coater, a squeeze coater, an impregnation coater, a transfer roll coater, a kiss coater, a cast coater, a spray coater, etc. may be used in combination.

In multilayer coating in the wet-on-wet coating system, an upper layer is coated while a lower layer is in a wet state, whereby the surface of the lower layer (that is, an interface of the lower and upper layers) is smooth, surface characteristics of the upper layer coating film are good and adhesiveness between the upper and lower layers is improved.

As a result, characteristics particularly required for a digital magnetic recording medium can be satisfied. Further, film strength is improved, durability is sufficient and dropout can be reduced by the wet-on-wet coating system to increase reliability.

Next, surface-smoothing treatment using a calender may be carried out. Subsequently, varnish treatment or blade treatment is carried out, if necessary, and a material obtained is slitted.

As calendering conditions in the surface-smoothing treatment, there may be mentioned a temperature, a linear pressure and a coating rate (C/S). In the present invention, in order to maintain surface characteristics of the magnetic recording medium to good conditions, it is preferred to maintain the above temperature at 50° to 140° C., the above linear pressure at 50 to 1,200 kg/cm and the above C/S at 20 to 600 m/min.

EXAMPLES

The constitution and effects of the present invention are described in detail by referring to Examples. However, as a matter of course, components, rates thereof and a order of procedures described below can be modified variously within the range which does not fall outside the scope of the present invention, and the scope of the present invention is not limited by the following Examples.

In the following Examples, all "part"s mean "part by weight"s.

The respective components of magnetic coatings for an upper layer and coatings for a lower layer having the following compositions were kneaded and dispersed by using a kneader and a sand mill, respectively, to prepare magnetic coatings for an upper layer and coatings for a lower layer.

<Magnetic coatings for upper layer>

| | Ferromagnetic metallic powder A | | | | | | |
|---|---|---|---|---|---|---|---|
| | Fe | Co | Ni | Nd | Al | Si | Na |
| Whole composition (parts by weight) | 100 | 6 | 7 | 4 | 4 | 1 | 0.0001 |
| Surface composition (atom number ratio) | 100 | 0 | 0 | 10 | 100 | 80 | 0.5 |

| | |
|---|---|
| (longer axis diameter: 0.10 μm, σs: 135 emu/g, BET specific surface area: 55 m²/g) | 100 parts |
| Vinyl chloride type resin having a potassium sulfonate group, MR-110 (trade name, produced by Nihon Zeon Co.) | 10 parts |
| Polyurethane resin having a sodium sulfonate group, UR-8700 (trade name, produced by Toyo Boseki Co.) | 10 parts |
| α-Alumina (average particle size: 0.15 μm) | 8 parts |
| Stearic acid | 1 part |
| Butyl stearate | 1 part |
| Cyclohexanone | 100 parts |
| Methyl ethyl ketone | 100 parts |
| Toluene | 100 parts |

<Coatings for lower layer>

| | |
|---|---|
| α-Iron oxide powder (α-Fe₂O₃) (shown in Tables 3-a and 4-a) | 100 parts |
| Vinyl chloride type resin having a potassium sulfonate group, MR-110 (trade name, produced by Nihon Zeon Co.) | 12 parts |
| Polyurethane resin having a sodium sulfonate group, UR-8700 (trade name, produced by Toyo Boseki Co.) | 8 parts |
| α-Alumina (average particle size: 0.2 μm) | 5 parts |
| Carbon black (average particle size: 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

Five parts of a polyisocyanate compound Colonate L (trade name, produced by Nihon Polyurethane Kogyo Co.) was added to the resulting magnetic coatings for an upper layer and the coatings for a lower layer, respectively.

Examples A-1 to B-12 and Comparative examples
A-1 to B-5

After the above magnetic coatings for an upper layer and coatings for a lower layer each containing ferromagnetic metallic powder shown in the respective tables were coated on a polyethylene terephthalate film having a thickness of 10 μm according to the wet-on-wet method, respectively, magnetic orientation treatment was carried out while coated films were not dried. Subsequently, the coated films were dried and subjected to surface-smoothing treatment by using a calender to prepare lower layers and upper layers having thicknesses shown in the respective tables.

Further, on each other surface (back surface) opposite to a side on which the lower layer and the upper layer were formed of the above polyethylene terephthalate film, a coating having the following composition was coated. A coated film was dried and then subjected to calendering under the above calendering conditions to form a back coat layer having a thickness of 0.8 μm, whereby a wide raw magnetic tape was obtained.

<Coating for back coat layer>

| | |
|---|---|
| Carbon black Raben 1035 (trade name, produced by Columbian Carbon Co.) (average particle size: 25 nm) | 40 parts |
| Barium sulfate (average particle size: 300 nm) | 10 parts |

-continued

| | |
|---|---|
| Nitrocellulose | 25 parts |
| Polyurethane type resin N-2301 (trade name, produced by Nippon Polyurethane Co.) | 25 parts |
| Polyisocyanate compound Colonate L (trade name, produced by Nippon Polyurethane Co.) | 10 parts |
| Cyclohexanone | 400 parts |
| Methyl ethyl ketone | 250 parts |
| Toluene | 250 parts |

The raw magnetic tapes thus obtained were slitted to prepare magnetic recording media for video having a width of 8 mm. The following evaluations of the magnetic recording media were conducted. The results are shown in Tables 3-b and 4-b.

<Evaluations>

<Surface composition of α-iron oxide powder existing on lower layer coating film>: measured according to the method described above.

<Whole composition of α-iron oxide powder>: measured according to the method described above.

<Surface composition of α-iron oxide powder>: measured according to the method described above.

<Reproduction output>

By using an 8 mm videocamera CCDV-900 (trade name) manufactured by Sony Co., RF output (dB) at 9 MHz was measured.

<Head clogging>

The number (average number per one pass) of head cloggings caused during repeated runnings of 100 times at a temperature of 40° C. and a relative humidity (RH) of 10% and at 20° C. and 20% RH was shown.

<Surface roughness: Ra>

A Talystep roughness meter (trade name, manufactured by Rank-Taylor-Hobson Co.) was used. Surface roughness was measured under conditions of a stylus of 2.5×0.1 μm, an acicular pressure of 2 mg, a cut-off filter of 0.33 Hz and a measurement rate of 2.5 μm/sec.

<Viscosity>

Viscosity of the coating was measured by using a B type viscometer No. 4 rotor (manufactured by Tokyo Keiki K.K.).

TABLE 3-a

| | Lower layer | | | | | | | | | | | | | |
|---|---|---|---|---|---|---|---|---|---|---|---|---|---|---|
| | Whole composition of α-iron oxide powder (parts by weight based on 100 parts by weight of Fe atom) | | | | | | Surface composition of α-iron oxide powder (number of atoms based on the number of Fe atom as 100) | | | | | | Shape of non-magnetic powder (acicular ratio) | Film thickness (μm) |
| | Al | Si | P | Alkaline earth | | Na | Al | Si | P | Alkaline earth | | Na | | |
| Example A-1 | 0.1 | 4.8 | ** | ** | ** | 0.04 | 10 | 58 | ** | ** | ** | 4 | 6 | 2.0 |
| Example A-2 | 2.3 | 1.1 | ** | ** | ** | 0.01 | 20 | 15 | ** | ** | ** | 1 | 7 | 0.2 |
| Example A-3 | 4.8 | 0.1 | ** | ** | ** | ** | 38 | 3 | ** | ** | ** | ** | 8 | 1.5 |
| Example A-4 | 0.1 | 0.1 | 5.0 | ** | ** | 0.01 | ** | 5 | 65 | ** | ** | 1 | 5 | 2.0 |
| Example A-5 | 2.0 | 2.0 | 0.2 | ** | ** | ** | 10 | 40 | 15 | ** | ** | ** | 9 | 2.5 |
| Example A-6 | 0.5 | 0.5 | 1.5 | ** | ** | ** | ** | 10 | 25 | ** | ** | ** | 10 | 2.0 |
| Example A-7 | 0.2 | 4.9 | ** | Ca 3.0 | ** | 0.01 | 3 | 35 | ** | Ca 28 | ** | ** | 8 | 1.8 |
| Example A-8 | 4.8 | 0.2 | ** | Ba 0.2 | ** | ** | 38 | 5 | ** | Ba 5 | ** | ** | 9 | 1.9 |
| Example A-9 | 1.0 | 1.0 | ** | Sr 4.9 | ** | ** | 15 | 2 | ** | Sr 28 | ** | ** | 6 | 1.7 |
| Example A-10 | 2.6 | 1.2 | ** | Ca 0.2 | Ba 1.5 | ** | 20 | 15 | ** | Ca 3 | Ba 5 | ** | 8 | 1.8 |
| Example A-11 | 2.0 | 1.0 | ** | Ca 0.5 | Ba 1.5 Sr 1.0 | ** | 25 | 10 | ** | Ca 5 | Ba 8 Sr 10 | ** | 7 | 1.6 |
| Comparative example A-1 | 0.0 | 0.0 | ** | ** | ** | 1.00 | ** | ** | ** | ** | ** | 16 | 6 | 1.6 |
| Comparative example A-2 | 0.1 | 0.6 | ** | ** | ** | 0.03 | 42 | 65 | ** | ** | ** | 10 | 6 | 1.9 |
| Comparative example A-3 | 6.0 | 0.0 | ** | ** | ** | 0.10 | 100 | 20 | ** | ** | ** | 3 | 7 | 1.8 |

**: the material is not contained or an amount is lower than the limit of detection.

TABLE 3-b

| | Upper layer | | | | Head clogging at 20° C. and 20% RH (1/PS) |
|---|---|---|---|---|---|
| | Film thickness (μm) | Metallic powder's Hc (Oe) | Reproduction output of magnetic layer (9 MHz) (dB) | Surface roughness Ra (nm) | |
| Example A-1 | 0.05 | 1800 | 1.5 | 2.0 | 1 |
| Example A-2 | 0.10 | 1850 | 2.0 | 2.2 | 1 |
| Example A-3 | 0.22 | 1950 | 2.0 | 2.5 | 0 |
| Example A-4 | 0.21 | 1920 | 2.0 | 1.6 | 0 |
| Example A-5 | 0.25 | 2100 | 2.5 | 1.4 | 0 |
| Example A-6 | 0.20 | 2080 | 2.0 | 2.0 | 0 |
| Example A-7 | 0.20 | 2000 | 2.5 | 1.8 | 0 |
| Example A-8 | 0.60 | 2100 | 3.5 | 1.9 | 0 |
| Example A-9 | 0.19 | 1950 | 3.0 | 1.7 | 0 |
| Example A-10 | 0.20 | 2150 | 4.5 | 1.3 | 0 |
| Example A-11 | 0.18 | 2060 | 4.0 | 1.2 | 0 |
| Comparative example A-1 | 0.20 | 1900 | 2.0 | 3.0 | 10 |
| Comparative example A-2 | 0.24 | 1850 | 1.0 | 3.3 | 13 |
| Comparative example A-3 | 0.30 | 1500 | 0.0 | 3.5 | 16 |

TABLE 4-a

| | Lower layer | | | | | | | | Upper layer | |
|---|---|---|---|---|---|---|---|---|---|---|
| | Surface composition of α-iron oxide powder in lower layer of medium | | | | | | | | | |
| | (number of atoms based on the number of Fe atom as 100) | | | | | | Shape of α-iron oxide powder | Film thickness | Film thickness | Metallic powder's Hc |
| | Al | Si | P | Alkaline earth | | Na | (acicular ratio) | (μm) | (μm) | (Oe) |
| Example B-1 | 38 | 1 | ** | ** | ** | 1 | 6 | 0.2 | 0.05 | 1750 |
| Example B-2 | 10 | 58 | ** | ** | ** | ** | 8 | 2.8 | 0.10 | 1800 |
| Example B-3 | 20 | 20 | ** | ** | ** | 1 | 10 | 2.0 | 0.15 | 1900 |
| Example B-4 | 9 | 38 | 2 | ** | ** | ** | 8 | 1.8 | 0.20 | 2000 |
| Example B-5 | ** | 8 | 20 | ** | ** | 1 | 5 | 1.7 | 0.20 | 2050 |
| Example B-6 | ** | 10 | 68 | ** | ** | ** | 7 | 2.0 | 0.18 | 2050 |
| Example B-7 | 1 | 40 | ** | Mg 30 | ** | 4 | 6 | 1.9 | 0.60 | 2100 |
| Example B-8 | 20 | 15 | ** | Ca 10 | ** | ** | 9 | 2.2 | 0.20 | 2200 |
| Example B-9 | 18 | 18 | ** | Ba 10 | ** | ** | 6 | 1.7 | 0.18 | 1900 |
| Example B-10 | 15 | 20 | ** | Sr 10 | ** | 1 | 9 | 2.0 | 0.18 | 1950 |
| Example B-11 | 20 | 20 | ** | Ca 2 | Ba 4 | ** | 7 | 2.0 | 0.18 | 2000 |
| Example B-12 | 20 | 20 | ** | Ca 5 | Sr 5 | ** | 8 | 2.0 | 0.18 | 2000 |
| Example B-13 | 25 | 15 | ** | Ca 3 | Ba 3 Sr 3 | ** | 5 | 2.0 | 0.18 | 2050 |
| Comparative example B-1 | ** | ** | ** | ** | ** | 10 | 8 | 2.0 | 0.20 | 1850 |
| Comparative example B-2 | 50 | 10 | ** | ** | ** | 5 | 3 | 2.0 | 0.25 | 1650 |
| Comparative example B-3 | 20 | ** | ** | ** | ** | 1 | 6 | 2.0 | 0.50 | 1600 |
| Comparative example B-4 | 15 | 70 | ** | ** | ** | 10 | 6 | 2.0 | 0.30 | 1550 |
| Comparative example B-5 | ** | ** | ** | ** | ** | 6 | 1 | 2.0 | 0.25 | 1850 |

**: the material is not contained or an amount is lower than the limit of detection.

TABLE 4-b

| | Reproduction output of magnetic layer | Head clogging at 40° C. and 10% RH | Viscosity of lower layer coating <B type viscometer> (poise) | |
|---|---|---|---|---|
| | (9 MHz) (dB) | (1/PS) | Before standing | After standing |
| Example B-1 | 1.5 | 1 | 15 | 13 |
| Example B-2 | 2.0 | 0 | 5 | 6 |
| Example B-3 | 2.0 | 1 | 2 | 3 |
| Example B-4 | 2.5 | 0 | 8 | 10 |
| Example B-5 | 3.0 | 0 | 3 | 4 |
| Example B-6 | 3.5 | 0 | 10 | 11 |
| Example B-7 | 3.0 | 0 | 12 | 12 |
| Example B-8 | 3.5 | 0 | 5 | 4 |
| Example B-9 | 3.0 | 0 | 6 | 7 |
| Example B-10 | 3.5 | 0 | 8 | 9 |
| Example B-11 | 4.5 | 0 | 4 | 6 |
| Example B-12 | 5.0 | 0 | 3 | 4 |
| Example B-13 | 4.0 | 0 | 9 | 9 |
| Comparative example B-1 | 0.5 | 15 | 40 | 60 |
| Comparative example B-2 | 0.0 | 10 | 35 | 90 |
| Comparative example B-3 | −0.5 | 4 | 20 | 50 |
| Comparative example B-4 | 0.0 | 6 | 4 | 26 |
| Comparative example B-5 | 0.5 | 5 | 3 | 40 |

As can be clearly seen from the results shown in the above tables, it can be seen that the magnetic recording media of the present invention are more excellent than those of Comparative examples.

The magnetic recording medium of the present invention is a magnetic recording medium suitable as a digital recording medium and having excellent surface characteristics and also excellent electromagnetic transfer characteristics and runnability, and having a coating for a lower layer having excellent dispersibility and standing stability and an upper layer coating film having excellent smoothness and running durability.

We claim:

1. A magnetic recording medium which comprises a non-magnetic support and a layer containing α-iron oxide powder as a lower layer and a layer containing ferromagnetic metallic powder as an upper layer which are provided on the non-magnetic support in this order from a side of the non-magnetic support, wherein the surface of the α-iron oxide powder in the lower layer has the average existence ratios of elements of 0 to 40 of aluminum (Al) atom and 1 to 60 of silicon (Si) atom based on the number of iron (Fe) atom as 100 in terms of the number of atoms, and the ferromagnetic powder in the upper layer contains Fe, Al and a rare earth element.

2. The medium of claim 1, wherein the surface of the α-iron oxide powder has the average existence ratios of elements of 0 to 10 of aluminum (Al) atom, 1 to 40 of silicon (Si) atom and 1 to 70 of phosphorus (P) atom based on the number of iron (Fe) atom as 100 in terms of the number of atoms.

3. The medium of claim 2, wherein the α-iron oxide powder has the weight ratios of elements of 0.05 to 2 parts by weight of aluminum (Al) atom, 0.05 to 2 parts by weight of silicon (Si) atom and 0.2 to 5 parts by weight of phosphorus (P) atom based on 100 parts by weight of iron (Fe) atom.

4. The medium of claim 2, wherein the surface of the α-iron oxide powder further has the average existence ratios of elements of 0 to less than 5 of sodium (Na) atom based on the number of iron (Fe) atom as 100 in terms of the number of atoms.

5. The medium of claim 4, wherein the α-iron oxide powder has the weight ratios of elements of 0.05 to 2 parts by weight of aluminum (Al) atom, 0.05 to 2 parts by weight of silicon (Si) atom, 0.2 to 5 parts by weight of phosphorus (P) atom and 0 to 0.05 part by weight of sodium (Na) atom based on 100 parts by weight of iron (Fe) atom.

6. The medium of claim 1, wherein the surface of the α-iron oxide powder has the average existence ratios of elements of 1 to 40 of aluminum (Al) atom, 1 to 40 of silicon (Si) atom and 1 to 30 of alkaline earth elements atom based on the number of iron (Fe) atom as 100 in terms of the number of atoms.

7. The medium of claim 6, wherein the α-iron oxide powder has the weight ratios of elements of 0.2 to 5 parts by weight of aluminum (Al) atom, 0.2 to 5 parts by weight of silicon (Si) atom and 0.2 to 5 parts by weight of alkaline earth elements atom based on 100 parts by weight of iron (Fe) atom.

8. The medium of claim 6, wherein the surface of the α-iron oxide powder further has the average existence ratios of elements of 0 to less than 5 of sodium (Na) atom based on the number of iron (Fe) atom as 100 in terms of the number of atoms.

9. The medium of claim 8, wherein the α-iron oxide powder has the weight ratios of elements of 0.2 to 5 parts by weight of aluminum (Al) atom, 0.2 to 5 parts by weight of silicon (Si) atom, 0 to less than 0.05 part by weight of sodium (Na) atom and 0.2 to 5 parts by weight of alkaline earth elements atom based on 100 parts by weight of iron (Fe) atom.

10. The medium of claim 1, wherein the α-iron oxide powder has the weight ratios of elements of 0.05 to 5 parts by weight of aluminum (Al) atom and 0.05 to 5 parts by weight of silicon (Si) atom based on 100 parts by weight of iron (Fe) atom.

11. The medium of claim 1, wherein the ferromagnetic powder contained in the upper layer is a ferromagnetic metallic powder.

12. The medium of claim 1, wherein the lower layer is a non-magnetic layer.

13. The medium of claim 1, wherein the α-iron oxide powder contained in the lower layer has an acicular shape.

14. The medium of claim 1, wherein the upper layer has a dry film thickness of 0.05 to 1.0 µm and the lower layer has a dried film thickness of 0.1 to 3.0 µm.

15. The medium of claim 13, wherein a longer axis diameter of the α-iron oxide powder is less than 0.30 µm.

16. The medium of claim 13, wherein an acicular ratio of the α-iron oxide powder is 2 to 20.

17. The medium of claim 1, wherein the content of the α-iron oxide powder in the lower layer is 50 to 99% by weight based on the total amount of the components constituting the lower layer.

18. The medium of claim 1, wherein the rare earth element is selected from the group consisting of samarium (Sm), neodymium (Nd), yttrium (Y) and praseodymium (Pr).

* * * * *